United States Patent

Hill et al.

Patent Number: 6,138,032
Date of Patent: *Oct. 24, 2000

[54] METHOD AND APPARATUS FOR DYNAMICALLY ADJUSTING A BATTERY SAVING INTERVAL IN A MESSAGING SYSTEM

[75] Inventors: Thomas Casey Hill, Trophy Club, Tex.; Thomas Victor D'Amico, Boca Raton, Fla.; Alain Charles Louis Briancon, Southlake; Jyh-Han Lin, Keller, both of Tex.; Samir Sawaya, San Diego, Calif.; Steven Jeffrey Goldberg, Fort Worth, Tex.; Zhonghe Wang, Lake Worth, Fla.; Jheroen Pieter Dorenbosch, Paradise; Terence Edward Sumner, Azle, both of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/864,518

[22] Filed: May 28, 1997

Related U.S. Application Data

[63] Continuation-in-part of application No. 08/689,617, Aug. 12, 1996, abandoned.

[51] Int. Cl.[7] .................................................... H04B 7/00
[52] U.S. Cl. .................... 455/517; 455/343; 340/825.44
[58] Field of Search .................................. 455/38.3, 393, 455/522, 69; 370/95.1, 95.2, 95.3, 311; 340/825.44, 825.06, 825.22, 825.26, 825.27

[56] References Cited

U.S. PATENT DOCUMENTS

| | | | |
|---|---|---|---|
| 4,449,248 | 5/1984 | Leslie et al. | 455/38 |
| 4,860,005 | 8/1989 | DeLuca et al. | 340/825.44 |
| 4,875,038 | 10/1989 | Siwiak et al. | . |
| 5,128,938 | 7/1992 | Borras | 370/95.1 |
| 5,230,084 | 7/1993 | Nguyen | 455/38.3 |
| 5,382,949 | 1/1995 | Mock et al. | 340/825.44 |
| 5,423,057 | 6/1995 | Kuznicki et al. | . |
| 5,459,457 | 10/1995 | Sharpe | 340/825.44 |
| 5,517,679 | 5/1996 | Yahagi | 455/38.3 |
| 5,606,728 | 2/1997 | Keba et al. | 455/38.3 |
| 5,623,533 | 4/1997 | Kikuchi et al. | 379/58 |
| 5,649,315 | 7/1997 | Eaton | 455/343 |
| 5,710,975 | 1/1998 | Bernhardt et al. | 455/38.3 |

*Primary Examiner*—Daniel S. Hunter
*Assistant Examiner*—Pablo N. Tran
*Attorney, Agent, or Firm*—R. Louis Breeden

[57] ABSTRACT

A battery saving interval utilized for communicating with a portable subscriber unit (122) in a radio communication system is dynamically adjusted. An occurrence of a predetermined triggering event associated with the portable subscriber unit is observed (504), and the battery saving interval utilized for communicating with the portable subscriber unit is adjusted (506) in response to the predetermined triggering event, while battery saving intervals of other portable subscriber units in the system are left unchanged.

10 Claims, 3 Drawing Sheets

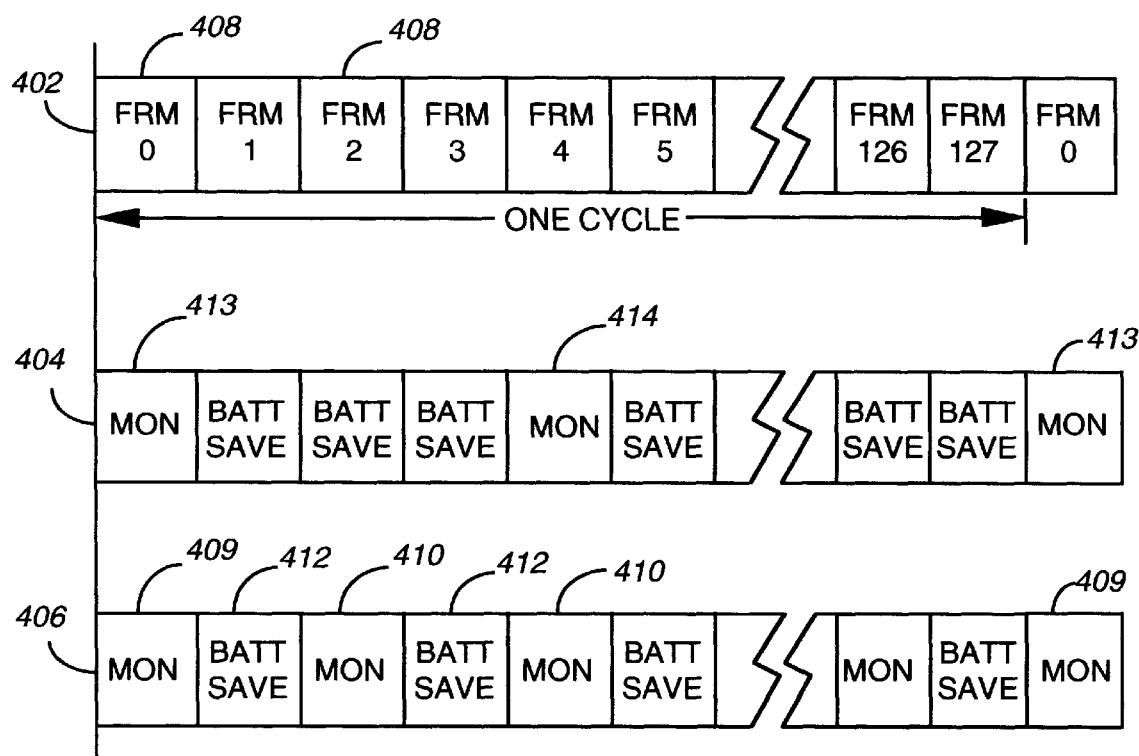
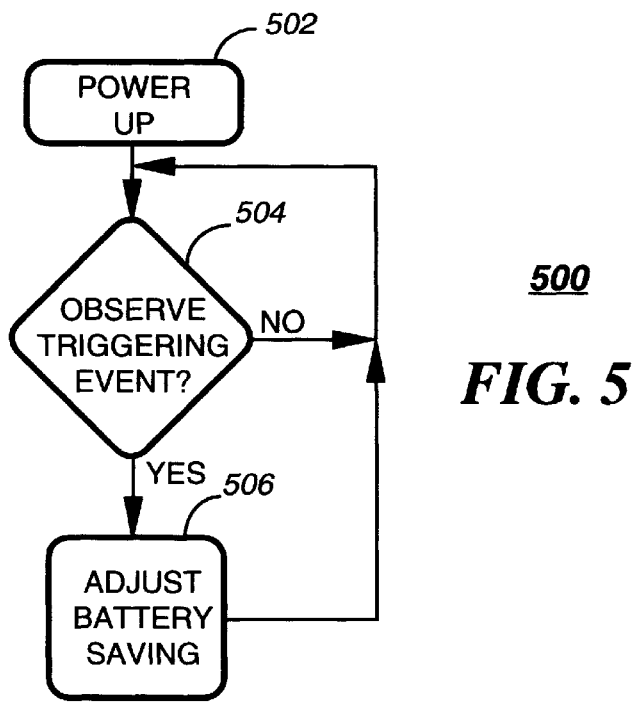
FIG. 4  400
FIG. 5  500

METHOD AND APPARATUS FOR DYNAMICALLY ADJUSTING A BATTERY SAVING INTERVAL IN A MESSAGING SYSTEM

RELATED APPLICATIONS

This application is a continuation-in-part of application Ser. No. 08/689,617, filed Aug. 12, 1996 now abandoned by Hill et al., entitled "Method and Apparatus for Dynamically Adjusting a Battery Saving Interval in a Messaging System."

Application Ser. No. 08/531,505 filed Sep. 21, 1995 by Eaton, entitled "Method for Selecting Battery Saving Period in a Selective Call Receiver."

FIELD OF THE INVENTION

This invention relates in general to radio communication systems, and more specifically to a method and apparatus for dynamically adjusting a battery saving interval in a messaging system.

BACKGROUND OF THE INVENTION

Battery saving techniques have become increasingly important in modern messaging systems that employ battery powered portable subscriber units. In general, such systems have transmitted messages in a plurality of cyclical time slots. Each subscriber unit has been assigned to a predetermined subset of the time slots and thus can remain in a low-power, "battery saving" mode during all time slots except the predetermined subset to which the subscriber unit is assigned.

Motorola's well-known FLEX™ protocol is a good example. The FLEX™ protocol utilizes a repeating transmission cycle consisting of 128 frames every four minutes. Each subscriber unit is pre-programmed by a "pager collapse" value between zero and seven to monitor every frame, every other frame, every fourth frame, every eighth frame, every sixteenth frame, every 32nd frame, every 64th frame, or every 128th frame, respectively. For best battery life, the subscriber unit is pre-programmed to monitor only every 128th frame (the longest battery saving interval). For fastest delivery of messages (lowest delivery latency), the subscriber unit is pre-programmed to monitor every frame. Thus, battery life and delivery latency can be traded off, depending on the pager collapse value chosen. In addition, the FLEX™ protocol accommodates a "system collapse" value transmitted at the start of each frame. The system collapse value affects all subscriber units in the system. In the event that the system collapse value and the pager collapse value are different in a given subscriber unit, the value which causes the subscriber unit to monitor the greater number of frames per cycle applies.

While the pager collapse value and the system collapse value have worked reasonably well for providing a pre-programmed trade-off between battery life and delivery latency and for overcoming certain queuing imbalances, neither provides a dynamically adjustable battery saving interval that can be custom tailored for an individual subscriber unit. A custom tailored, dynamically adjustable battery saving interval is needed, because events can occur in the messaging system that can temporarily alter the optimum trade-off between battery life and delivery latency for a given subscriber unit.

SUMMARY OF THE INVENTION

An aspect of the present invention is a method of applying a dynamic adjustment to a battery saving interval utilized for communicating with a portable subscriber unit in a radio communication system. The method comprises the steps of observing an occurrence of a predetermined triggering event associated with the portable subscriber unit, and adjusting the battery saving interval utilized for communicating with the portable subscriber unit in response to the predetermined triggering event, while leaving battery saving intervals of other portable subscriber units in the system unchanged.

Another aspect of the present invention is a controller in a radio communication system for applying a dynamic adjustment to a battery saving interval utilized for communicating with a portable subscriber unit. The controller comprises a network interface for accepting messages from message originators, and a processing system coupled to the network interface for processing the messages. The controller further comprises a transceiver interface coupled to the processing system for transmitting the messages and for receiving acknowledgments to the messages. The processing system is programmed to observe an occurrence of a predetermined triggering event associated with the portable subscriber unit; and to adjust the battery saving interval utilized for communicating with the portable subscriber unit in response to the predetermined triggering event, while leaving battery saving intervals of other portable subscriber units in the system unchanged.

Another aspect of the present invention is a portable subscriber unit in a radio communication system for applying a dynamic adjustment to a battery saving interval utilized for communicating with a fixed portion of the system. The portable subscriber unit comprises a receiver for receiving messages from the fixed portion, and a processing system coupled to the receiver for processing the messages. The portable subscriber unit further comprises a transmitter coupled to the processing system for acknowledging the messages. The processing system is programmed to observe an occurrence of a predetermined triggering event associated with the portable subscriber unit; and to adjust the battery saving interval utilized for communicating with the fixed portion in response to the predetermined triggering event, while leaving battery saving intervals of other portable subscriber units in the system unchanged.

BRIEF DESCRIPTION OF THE DRAWINGS

FIG. 4 is a protocol diagram in accordance with the present invention.

FIG. 5 is a flow chart depicting operation of the radio communication system in accordance with the present invention.

DESCRIPTION OF THE PREFERRED EMBODIMENT

Figure 1:
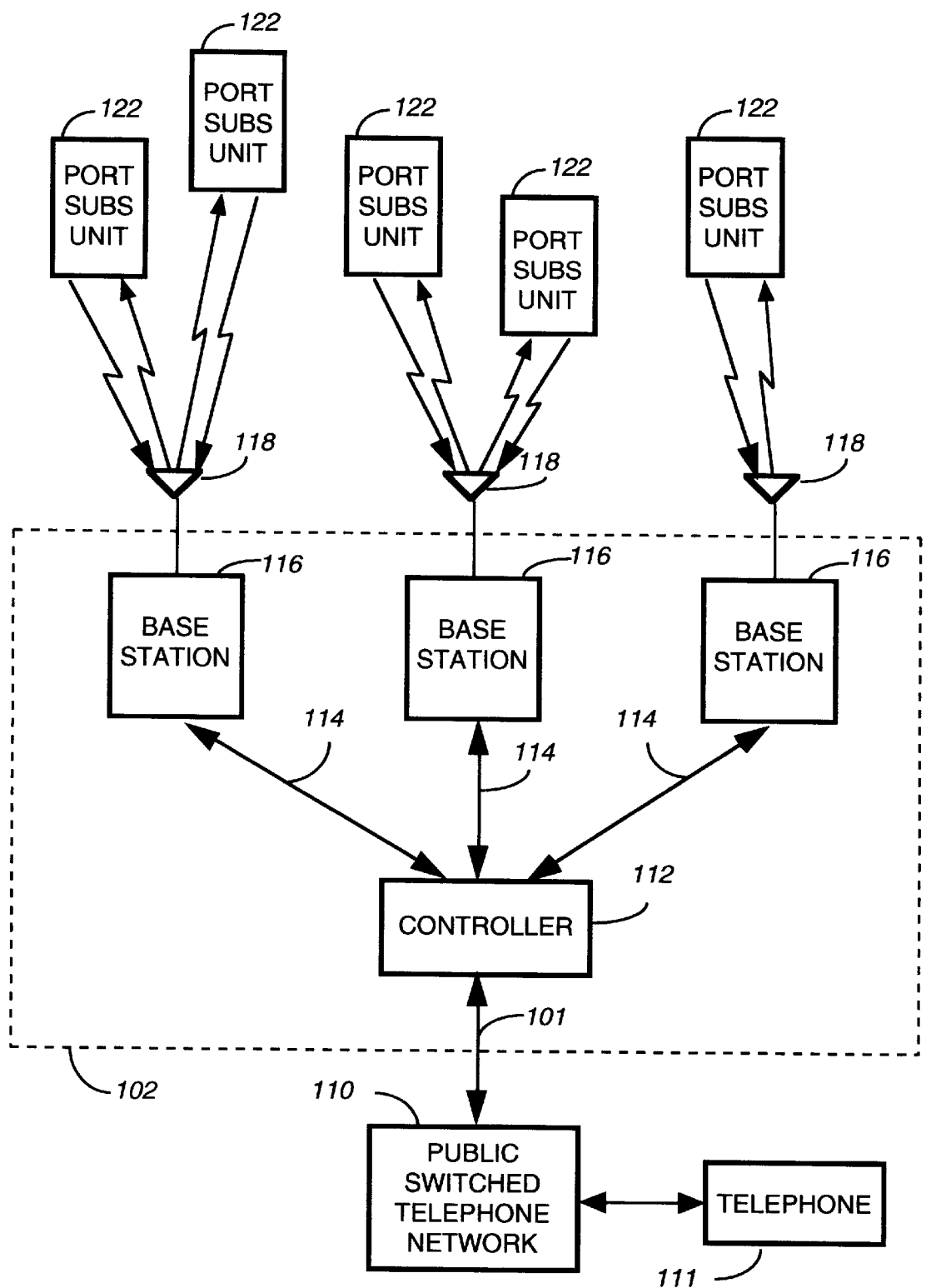
FIG. 1 is an electrical block diagram of a radio communication system in accordance with the present invention.

Referring to FIG. 1, an electrical block diagram of a radio communication system in accordance with the present invention comprises a fixed portion 102 including a controller 112 and a plurality of base stations 116, and a portable portion including a plurality of portable subscriber units 122, preferably having acknowledge-back capability. The base stations 116 are used for communicating with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized as well for the controller 112 and the base stations 116.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and data or voice messages originated by a caller. The RF signals transmitted by the portable subscriber units 122 to the base stations 116 (inbound messages) comprise responses that include positive acknowledgments (ACKs), negative acknowledgments (NAKs), and unscheduled messages. An embodiment of an acknowledge-back messaging system is described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable two-way protocols can be used as well.

Figure 2:
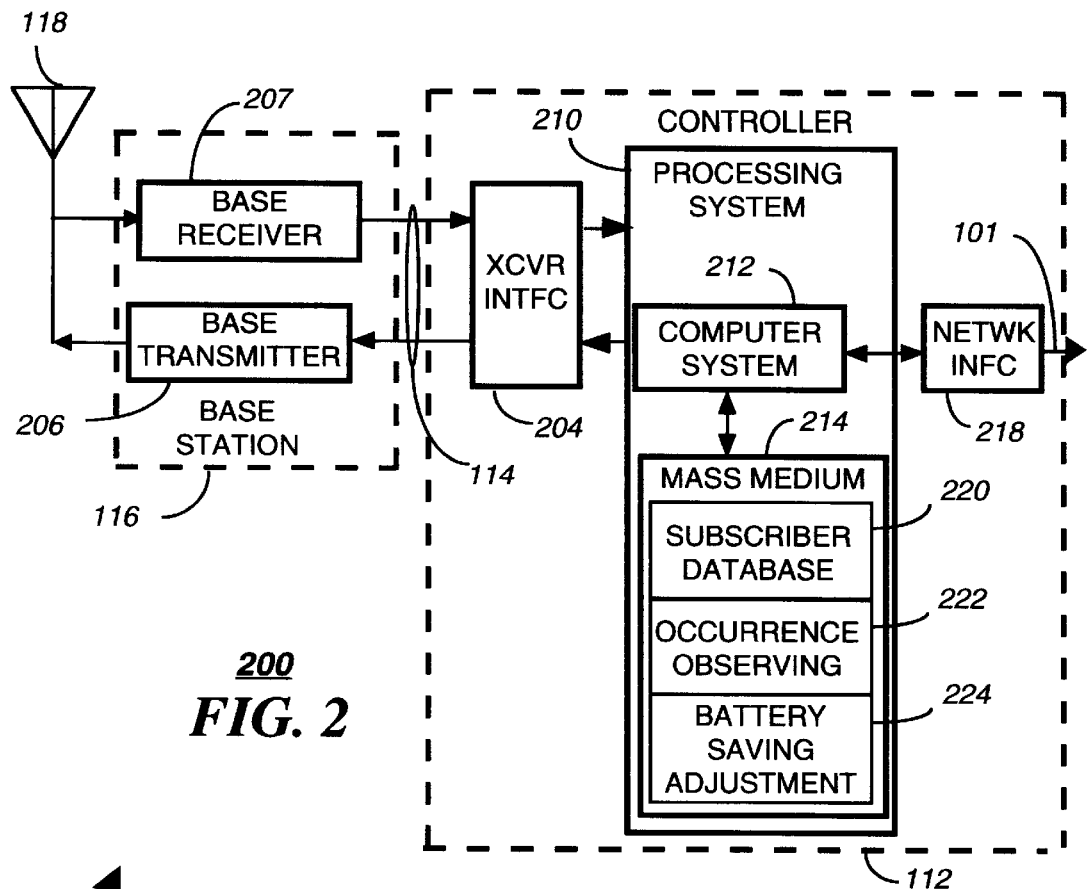
FIG. 2 is an electrical block diagram of portions of a controller and a base station in accordance with the present invention.

FIG. 2 is an electrical block diagram 200 of portions of the controller 112 and the base station 116 in accordance with the present invention. The controller 112 includes a processing system 210, a transceiver interface 204, and a network interface 218. The base station 116 includes a base transmitter 206 and at least one base receiver 207.

The processing system 210 is used for directing operations of the controller 112. The processing system 210 preferably is coupled through the transceiver interface 204 to the base transmitter 206 via the communication link 114. The processing system 210 preferably also is coupled through the transceiver interface 204 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The conventional mass storage medium 214 includes, for example, a subscriber database 220, comprising subscriber user information such as addressing and programming options of the portable subscriber units 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207. It will be further appreciated that, alternatively, in some systems the transmitter 206 can be arranged such that it can transmit a plurality of independent messages on a plurality of communication channels at the same time.

The mass medium 214 preferably includes software and various databases utilized in accordance with the present invention. An occurrence observing element 222 of the mass medium includes software for observing an occurrence of a predetermined triggering event associated with the portable subscriber unit 122, as will be described further below. In addition, a battery saving adjustment element 224 adjusts a battery saving interval utilized for communicating with the portable subscriber unit 122 in response to the predetermined triggering event, as will also be described further below.

Figure 3:
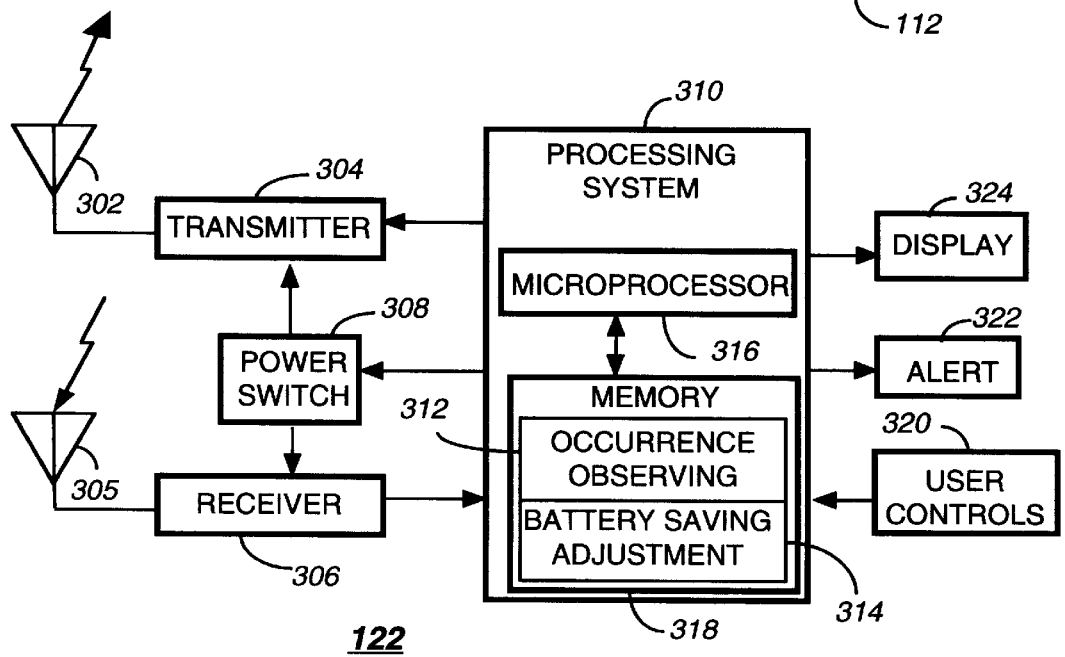
FIG. 3 is an electrical block diagram of a portable subscriber unit in accordance with the present invention.

FIG. 3 is an electrical block diagram of the portable subscriber unit 122 utilized in practicing the present invention. The portable subscriber unit 122 comprises a transmitter antenna 302 for transmitting RF signals to the base stations 116, and a receiver antenna 305 for intercepting RF signals from the base stations 116. The transmitter antenna 302 is coupled to a conventional RF transmitter 304. Similarly, the receiver antenna 305 is coupled to a conventional RF receiver 306. It will be appreciated that, alternatively, the receiver 306 and transmitter 304 can be coupled to a single transceiver antenna, which transmits and intercepts RF signals to and from the base stations 116.

Radio signals received by the RF receiver 306 produce demodulated information at the output. The demodulated information is coupled to the input of a processing system 310 for directing operations of the portable subscriber unit 122, and for processing outbound messages. Similarly, inbound messages are processed by the processing system 310 and delivered to the RF transmitter 304 for transmission to the base stations 116. A conventional power switch 308, coupled to the processing system 310, controls the supply of power to the RF transmitter 304 and RF receiver 306, thereby providing a battery saving function in accordance with the present invention.

To perform the necessary functions of the portable subscriber unit 122, the processing system 310 includes a microprocessor 316, and a memory 318. The microprocessor 316 is, for example, embodied by the M68HC08 microcontroller manufactured by Motorola, Inc. The memory 318 preferably includes a conventional read-only memory (ROM) and a conventional random-access memory (RAM).

The microprocessor 316 is programmed by way of the memory 318 to process received outbound messages, and in response thereto to create and format inbound messages. During outbound message processing, the microprocessor 316 samples the demodulated signal generated by the RF receiver 306. The microprocessor 316 then decodes an address in the demodulated data of the outbound message, compares the decoded address with one or more addresses stored in the memory 318, and when a match is detected, proceeds to decode the accompanying message.

Once the microprocessor 316 has processed the message, if the message was received without more errors than the microprocessor 316 can correct according to the protocol, then the microprocessor 316 transmits an acknowledgment (ACK) signal to the fixed portion 102. The microprocessor 310 then stores the message in the memory 318, and generates a call alerting signal to alert a user that a message has been received. The call alerting signal is directed to a conventional audible or tactile alerting device 322 for generating an audible or tactile call alerting signal. On the other hand, if the message was received with more errors than the microprocessor 316 can correct according to the protocol, then the microprocessor 316 transmits a negative acknowledgment (NAK) signal to the fixed portion 102, so that the fixed portion 102 can resend the message.

By the use of appropriate functions provided by the user controls 320, the outbound message is recovered from the memory 318, and displayed on a display 324, e.g., a conventional liquid crystal display (LCD). Alternatively, when the message is a voice message, the message is reproduced on a conventional audio circuit (not shown in FIG. 3) that is included in the portable subscriber unit 122. Preferably, the portable subscriber unit 122 utilizes components similar to those of the Tenor™ and Tango™ personal messaging units manufactured by Motorola, Inc. of Schaumburg Ill. It will be appreciated that other similar components can be utilized as well for the portable subscriber unit 122.

In accordance with the present invention, the memory 318 also includes an occurrence observing element 312 for observing an occurrence of a predetermined triggering event associated with the portable subscriber unit 122, as will be described further below. In addition, a battery saving adjustment element 314 adjusts the battery saving interval utilized for communicating by the portable subscriber unit 122 in response to the predetermined triggering event, as will also be described further below.

Referring to FIG. 4, a protocol diagram in accordance with the present invention depicts a FLEX™ transmission cycle 402 consisting of 128 transmission frames. Also depicted is a first battery saving operation 404 for a subscriber unit 122 which monitors the first frame 413 and every subsequent fourth frame 414 of the transmission cycle, while battery saving for a battery saving interval equal to the duration of the three frames between the monitored frames. A second battery saving operation 406 is also depicted in which the subscriber unit 122 monitors the first frame 409 and every alternate frame 410 thereafter, while battery saving for a battery saving interval equal to the duration of the single frames between the monitored frames. In accordance with the present invention, the radio communication system dynamically adjusts the battery saving interval utilized for communicating with the portable subscriber unit 122 in response to a predetermined triggering event, while leaving battery saving intervals of other portable subscriber units in the system unchanged. For example, the system can switch between the first and second battery saving operations 404, 406 in response to the predetermined triggering event. The ability to switch dynamically between different battery saving intervals advantageously allows the system to maintain long battery life while retaining an ability to reduce delivery latency when required for special events uniquely associated with the portable subscriber unit 122.

It will be appreciated that in the FLEX™ protocol the above described method of adjusting the battery saving interval can adjust the interval from a low limit of zero (minimum battery saving and minimum delivery latency) to a high limit of 127 frames (maximum battery saving and maximum delivery latency). It will be further appreciated that for proper operation both the fixed portion 102 of the system and the portable subscriber unit 122 must switch their respective battery saving intervals simultaneously in a coordinated fashion. This is easily accomplished without additional communication when the triggering event is known to both the fixed portion 102 and the portable subscriber unit 122. Alternatively, when the triggering event is known to only one of the fixed portion 102 and the portable subscriber unit 122, then the switching of the respective battery saving intervals requires a message to be transmitted between the fixed portion 102 and the portable subscriber unit 122 to effect the change.

FIG. 5 is a flow chart 500 depicting operation of the radio communication system in accordance with the present invention. The flow chart 500 begins when the system is powered up 502. Thereafter, whenever the controller 112 and/or the portable subscriber unit 122 observes 504 an occurrence of a predetermined triggering event, action is taken to adjust the battery saving interval utilized for communicating with the portable subscriber unit 122 in response to the predetermined triggering event, while leaving battery saving intervals of other portable subscriber units 122 in the system unchanged.

In one embodiment according to the present invention the predetermined triggering event comprises a presence of a message in queue for the portable subscriber unit 122, the message having a length greater than a predetermined length. For example, a message long enough to require multiple frames 408 for transmission can trigger a shorter battery saving interval so that the message can be delivered with less delay. When delivery of the long message is complete, the battery saving interval is restored to a nominal value for better battery life. As the portable subscriber unit 122 has no knowledge of the presence of the long message prior to its transmission, the controller 112 preferably commands the portable subscriber unit 122 to shorten its battery saving interval prior to transmission of the message.

In a second embodiment, the predetermined triggering event comprises a presence of a message in queue for the portable subscriber unit 122, the message being of a predetermined type. For example, a voice message can be sent utilizing the nominal battery saving interval, while an interactive data message is sent utilizing a shorter battery saving interval. As in the example above, the controller 112 preferably commands the portable subscriber unit 122 to shorten its battery saving interval prior to transmission of the interactive data message.

In a third embodiment, the battery saving interval is adapted by an amount determined from a call rate experienced by the portable subscriber unit 122 during a predetermined period. For example, the call rate of the portable subscriber unit 122 during a predetermined time period, e.g., the preceding 24 hours, is monitored by both the controller 112 and the portable subscriber unit 122. If the call rate exceeds a predetermined value, e.g., three calls per hour, then the battery saving interval is shortened. Otherwise, the battery saving interval remains at the nominal value. As both the controller 112 and the portable subscriber unit 122 can compute the call rate of the portable subscriber unit 122 at some predetermined time, e.g., once every hour on the hour, no additional communication is required between the controller 112 and the portable subscriber unit 122 to effect the change in the battery saving interval.

In a fourth embodiment, the battery saving interval is adapted by an amount determined from an elapsed time since a last communication was experienced by the portable subscriber unit 122. For example, both the controller 112 and the portable subscriber unit 122 can determine the elapsed time since a last communication was experienced by the portable subscriber unit 122. Then, when a message is queued for the portable subscriber unit 122, if the elapsed time since a prior message was received is less than a predetermined amount, e.g., fifteen minutes, both the controller 112 and the portable subscriber unit 122 can utilize a shorter battery saving interval for a subsequent predetermined period, e.g., the next hour.

In a fifth embodiment, the battery saving interval is adapted by an amount determined from a user preference entered through a user control of the portable subscriber unit 122. This feature is useful, for example, to reduce delivery latency when the user is expecting an important and urgent message.

In a sixth embodiment the battery saving interval is adapted by an amount determined from a battery capacity of the portable subscriber unit 122. For example, the battery saving interval can be shortened for improved delivery latency when a high-capacity battery is installed in the portable subscriber unit 122. It will be appreciated that the battery must be encoded to identify its capacity to the portable subscriber unit 122, which in turn must request a shorter battery saving interval from the controller 112. The battery capacity can be encoded, for example, by the presence or absence of a mechanical notch in the battery which would be detected by a micro switch when the battery is installed in the portable subscriber unit 122.

In a seventh embodiment, the predetermined triggering event occurs in response to an attempt to send a message to the portable subscriber unit 122, the message having a message priority. Then, the battery saving interval is adapted by an amount determined by the message priority. For example, a message having the highest priority can cause the utilization of the shortest battery saving interval in order to minimize the delivery latency.

In an eighth embodiment, the battery saving interval is adapted by an amount determined by whether or not the portable subscriber unit 122 is connected to an external power source. For example, when the external power source is connected, the portable subscriber unit 122 can request the controller 112 to switch to the shortest battery saving interval for best delivery latency, as power consumption is of little concern. Any of several well known techniques, e.g., a micro switch closure, electrical contact closure, etc., can be utilized for determining that the external power source has been connected.

In a ninth embodiment, the battery saving interval is adapted by an amount determined by time of day. For example, during the busiest hours of the day the battery saving interval can be reduced to shorten delivery latency, while at other times the battery saving interval is restored to the nominal value to conserve battery power.

In a tenth embodiment, the predetermined triggering event is a request from the portable subscriber unit 122 which requires a response from the fixed portion 102, and the adjusting step preferably occurs automatically in both the fixed portion 102 and the portable subscriber unit 122 in response to the request. For example, the portable subscriber unit 122 can request some information, e.g., a stock quotation. In response, both the portable subscriber unit 122 and the fixed portion 102 switch to a shortened battery saving interval for delivery of the stock quotation, after which the battery saving interval is restored to the nominal value.

In an eleventh embodiment, the predetermined triggering event is a request from the portable subscriber unit 122 which requires a response from the fixed portion 102, and the step of adjusting the battery saving interval comprises the step of transmitting a command from the fixed portion 102 to the portable subscriber unit 122 to complete the adjusting step in response to the request.

In a twelfth embodiment, the battery saving interval has a nominal value before applying the dynamic adjustment to the battery saving interval, and the predetermined triggering event is a request from the portable subscriber unit 122 which requires a response from the fixed portion 102. In this case, the adjusting step comprises the step of restoring the battery saving interval to the nominal value by one of: (a) a time-out after commencing the adjusting step, (b) a communication of the response, and (c) a command sent between the fixed portion 102 and the portable subscriber unit 122.

In a thirteenth embodiment, the observing step comprises the step of detecting a transmission of a negative acknowledgment (NAK) from the portable subscriber unit 122, and the adjusting step comprises the step of shortening the battery saving interval in response to the NAK. In this manner a retry message sent in response to the NAK advantageously will receive a faster delivery. In this embodiment the observing step further comprises the step of detecting a transmission of a positive acknowledgment (ACK) from the portable subscriber unit 122, and the adjusting step further comprises the step of restoring the battery saving interval to the nominal value in response to the ACK. Alternatively, the adjusting step can further comprise the step of restoring the battery saving interval to the nominal value a predetermined time after the NAK. In addition, the retry message is preferably queued in response to the NAK, such that the retry message is given transmission priority over non-retry messages in the system. In this embodiment, the step of shortening the battery saving interval preferably comprises the step of reducing the battery saving interval to a minimum possible value, after which a Where aRe You (WRU) command is transmitted to the portable subscriber unit 122 in a next available transmission frame. This procedure advantageously allows the location of the portable subscriber unit 122 to be quickly ascertained so that a nearby base station 116 can be selected to communicate with the portable subscriber unit 122.

In a fourteenth embodiment, the triggering event is a command transmitted to the portable subscriber unit from a fixed portion of the radio communication system. The command preferably can change the battery saving interval to a level that is either higher or lower than the system collapse value transmitted by the radio communication system. The command preferably can specify a duration determined by, for example, a time limit, or until further notice, or when the portable subscriber unit leaves the zone in which it is currently located. The command can be implemented in the FLEX™ protocol, for example, by creating a new vector, using well-known techniques. After receiving the command, the portable subscriber unit adjusts its battery saving interval in accordance with the command. Alternatively, the command can direct the portable subscriber unit to disable a currently used address set for a current battery saving interval and to enable a different address set for a different battery saving interval.

In a fifteenth embodiment, the battery saving interval of the portable subscriber unit is set to a new level. This can be done by a semi-permanent firmware modification in the portable subscriber unit or, alternatively, by a command from the fixed portion of the system. After the battery saving interval is set to the new level, the portable subscriber unit ignores system battery saving intervals transmitted in the future by the fixed portion of the radio communication system. This embodiment is particularly useful to subscriber units which require very long battery saving intervals, e.g., two-way subscriber units used for reporting water meter readings. Such units need to communicate with the system only once every few hours, and thus will benefit from ignoring the (shorter) system battery saving intervals, which are optimized for normal message traffic.

In a sixteenth embodiment, the predetermined triggering event is an application program running in the portable subscriber unit, and the system and the subscriber unit adjust the battery saving interval in accordance with the requirements of the application program. In the event that the system starts and stops the application program, both the subscriber unit and the fixed portion are aware of the running of the application program, and can act accordingly. When the subscriber unit starts and stops the application program by itself, it must communicate the starting and stopping thereof to the fixed portion of the system.

It will be appreciated that in the above embodiments adjusting the battery saving interval includes adjusting at least one of (a) the battery saving interval utilized for outbound communications to the portable subscriber unit, i.e., the outbound collapse, and (b) the battery saving interval utilized for inbound communications from the portable subscriber unit, i.e., the inbound retry interval for non-acknowledged inbound messages.

In some of the preceding embodiments, similar information is present in both the fixed portion 102 of the radio communication system and in the portable subscriber unit 122. Thus, the steps of observing the occurrence of the predetermined triggering event and adjusting the battery saving interval utilized for communicating with the portable subscriber unit 122 in response to the predetermined triggering event occur independently in both the fixed portion 102 and the portable subscriber unit 122 based upon the similar information present. For such cases no communication is required between the fixed portion 102 and the portable subscriber unit 122 to effect the change in the battery saving interval. In others of the preceding embodiments, however, the observing step occurs in only one of the fixed portion 102 and the portable subscriber unit 122, and a communication is required between the fixed portion 102 and the portable subscriber unit 122 to accomplish the adjustment of the battery saving interval.

Thus it should be apparent that the present invention advantageously provides a dynamically adjustable battery saving interval that can be custom tailored for an individual subscriber unit. A custom tailored, dynamically adjustable battery saving interval is useful and desirable, because events can occur in the messaging system that can temporarily alter the optimum trade-off between battery life and delivery latency for a given subscriber unit.

What is claimed is:

1. A method of applying a dynamic adjustment to a battery saving interval utilized for communicating with a portable subscriber unit in a radio communication system which employs a protocol having a transmission cycle comprising a plurality of frames, the method comprising the steps of:

observing an occurrence of a predetermined triggering event associated with the portable subscriber unit; and adjusting a number of frames during which the portable subscriber unit will battery save when next operating in a battery saving mode in response to the predetermined triggering event, while leaving battery saving intervals of other portable subscriber units in the system unchanged, wherein said number of frames during which the portable subscriber unit will battery save when next operating in a battery saving mode is adjusted in response to at least one of:

whether a message type to be sent to the portable subscriber unit is voice, as opposed to data;

an elapsed time being less than a predetermined amount, said elapsed time being that between a prior message received by the portable subscriber unit and a message currently queued for the portable subscriber unit;

a priority level associated with the message;

detecting a transmission of a negative acknowledgement (NAK) from the portable subscriber unit; and communication requirements for running an application program in the portable subscriber unit when the application program is started and stopped.

2. The method of claim 1, wherein the predetermined triggering event comprises a presence of a message in queue for the portable subscriber unit, said message being of a type selected from one of voice and data, and wherein the adjusting step comprises the step of adjusting said number of frames according to said type.

3. The method of claim 1, wherein the adjusting step comprises the step of adjusting said number of frames in response to an elapsed time being less than a predetermined amount, said elapsed time being that between a prior message received by the portable subscriber unit and a message currently queued for the portable subscriber unit.

4. The method of claim 1, wherein the predetermined triggering event occurs in response to an attempt to send a message to the portable subscriber unit, the message having a priority, and wherein the adjusting step comprises the step of adjusting said number of frames in response to a priority level associated with the message.

5. The method of claim 1,
wherein the radio communication system comprises a fixed portion and the portable subscriber unit, and
wherein the observing and adjusting steps occur independently in both the fixed portion and the portable subscriber unit based upon similar information present in the fixed portion and in the portable subscriber unit and without requiring a communication between the fixed portion and the portable subscriber unit.

6. The method of claim 1,
wherein the predetermined triggering event is a starting or stopping of an application program in the portable subscriber unit; and
wherein the adjusting step comprises the step of adjusting said number of frames in accordance with the communication requirements for running the application program.

7. The method of claim 1,
wherein the battery saving interval has a nominal value before applying the dynamic adjustment, and
wherein the observing step comprises the step of detecting a transmission of a negative acknowledgment (NAK) from the portable subscriber unit, and
wherein the adjusting step comprises the step of shortening the battery saving interval in response to the NAK, and
wherein the method further comprises the step of queuing a retry message in response to the NAK, such that the retry message is given transmission priority over non-retry messages in the system.

8. The method of claim 1,
wherein the battery saving interval has a nominal value before applying the dynamic adjustment, and
wherein the observing step comprises the step of detecting a transmission of a negative acknowledgment (NAK) from the portable subscriber unit, and
wherein the adjusting step comprises the step of reducing the battery saving interval to a minimum possible value in response to the NAK, and
wherein the method further comprises the step of transmitting a Where aRe You (WRU) command to the portable subscriber unit in a next available transmission frame.

9. A controller in a radio communication system for applying a dynamic adjustment to a battery saving interval utilized for communicating with a portable subscriber unit, the radio communication system employing a protocol having a transmission cycle comprising a plurality of frames, the controller comprising:
a network interface for accepting messages from message originators;
a processing system coupled to the network interface for processing the messages; and
a transceiver interface coupled to the processing system for transmitting the messages and for receiving acknowledgments to the messages,
wherein the processing system is programmed to:
observe an occurrence of a predetermined triggering event associated with the portable subscriber unit, and
adjust a number of frames during which the portable subscriber unit will battery save when next operating in a battery saving mode in response to the predetermined triggering event, while leaving battery saving intervals of other portable subscriber units in the system unchanged, wherein said number of frames during which the portable subscriber unit will battery save when next operating in a battery saving mode is adjusted in response to at least one of:
whether a message type to be sent to the portable subscriber unit is voice, as opposed to data;
an elapsed time being less than a predetermined amount, said elapsed time being that between a prior message received by the portable subscriber unit and a message currently queued for the portable subscriber unit;
a priority level associated with the message;
detecting a transmission of a negative acknowledgment (NAK) from the portable subscriber unit; and
communication requirements for running an application program in the portable subscriber unit when the application program is started and stopped.

10. A portable subscriber unit in a radio communication system for applying a dynamic adjustment to a battery saving interval utilized for communicating with a fixed portion of the system, the radio communication system employing a protocol having a transmission cycle comprising a plurality of frames, the portable subscriber unit comprising:
a receiver for receiving messages from the fixed portion;
a processing system coupled to the receiver for processing the messages; and
a transmitter coupled to the processing system for acknowledging the messages,
wherein the processing system is programmed to:
observe an occurrence of a predetermined triggering event associated with the portable subscriber unit; and
adjust a number of frames during which the portable subscriber unit will battery save when next operating in a battery saving mode in response to the predetermined triggering event, while leaving battery saving intervals of other portable subscriber units in the system unchanged, wherein said number of frames during which the portable subscriber unit will battery save when next operating in a battery saving mode is adjusted in response to at least one of:
whether a message type to be sent to the portable subscriber unit is voice, as opposed to data;
an elapsed time being less than a predetermined amount, said elapsed time being that between a prior message received by the portable subscriber unit and a message currently queued for the portable subscriber unit;
a priority level associated with the message;
detecting a transmission of a negative acknowledgment (NAK) from the portable subscriber unit; and
communication requirements for running an application program in the portable subscriber unit when the application program is started and stopped.

* * * * *